Aug. 1, 1967

G. F. EVESON ET AL 3,333,692

DRYING AND CLEANING OF SMALL OR FINE COAL, OR OTHER
PARTICULATE MATERIALS, CONTAINING COMPONENTS
OF DIFFERENT SPECIFIC GRAVITIES

Filed Nov. 18, 1963

Inventors
Geoffrey F. Eveson,
George T. Richards
by Sommers + Young
Attorneys

Aug. 1, 1967   G. F. EVESON ET AL   3,333,692
DRYING AND CLEANING OF SMALL OR FINE COAL, OR OTHER
PARTICULATE MATERIALS, CONTAINING COMPONENTS
OF DIFFERENT SPECIFIC GRAVITIES
Filed Nov. 18, 1963   8 Sheets-Sheet 8

Inventors
Geoffrey F. Eveson,
George T Richards
by Sommers & Young
Attorneys

United States Patent Office 3,333,692
Patented Aug. 1, 1967

3,333,692
DRYING AND CLEANING OF SMALL OR FINE COAL, OR OTHER PARTICULATE MATERIALS, CONTAINING COMPONENTS OF DIFFERENT SPECIFIC GRAVITIES
Geoffrey Frank Eveson and George Thomas Richards, Sheffield, England, assignors to Head, Wrightson & Company Limited, Thornaby-on-Tees, England
Filed Nov. 18, 1963, Ser. No. 324,448
9 Claims. (Cl. 209—474)

This invention concerns improvements relating to the drying and cleaning of small or fine coal, or other particulate materials, containing components of different specific gravities, and is an improvement in or modification of the invention forming the subject of our earlier United States patent application Ser. No. 171,741 now Patent No. 3,261,463, dated July 19, 1966, of which this application is a continuation-in-part.

According to the latter, a process (hereinafter termed "of the kind described") for cleaning or drying and cleaning impure small or fine coal, or other particulate material, having components of different specific gravities, comprises delivering the said coal or other material (both hereinafter referred to simply as "material") into a fluidised bed or beds of discrete solid particles, maintaining the bed or beds in fluidised condition by a heated gaseous medium applied thereto in such a manner as to give, and retain in, the bed or beds a specific gravity effective to cause separation of the said material into two or more fractions of different specific gravities, and freeing the thus separated products from such of the discrete solid particles as discharge with them from the process.

According to another feature of the earlier patent applications aforesaid an apparatus (hereinafter termed "of the kind described") for drying and cleaning said material comprises a fluidising vessel, a perforate support or supports in said vessel for a fluidised bed or beds of discrete solid particles, means for feeding said discrete solid particles to said vessel and on to said support or supports, mean for supplying heated or unheated gaseous medium continuously or in pulsations to said vessel under conditions operative to form and maintain said fluidised bed or beds, means for feeding said material to said vessel and delivering it into the fluidised bed or beds for separation of such material into two or more fractions of different specific gravities, and means for freeing the thus separated products from such of the discrete solid particles as are discharged with them from the fluidised bed or beds.

It is to be noted that where, hereinafter in the present description and in relation to the separation treatment, the terms "cleaned coal product" and "discard product" are used, it is intended that they shall broadly cover "fraction of relative low specific gravity" or so-called "floats" product and "fraction of higher specific gravity" or so-called "sinks" product, respectively, of the material subjected to separation. In this manner, it is to be understood that the invention is applicable to the separating, or drying and separating, treatment of all relevant minerals or ores, including coals.

According to the present invention and as improvements in, or modifications of, the invention of the earlier United States patent application Ser. No. 171,741, now Patent No. 3,261,463, a series of features are provided (being developments of the earlier invention), which will be hereinafter described under various headings and are illustrated by way of example in the accompanying drawings wherein:

FIGURE 1 is a diagrammatic sectional elevation of an apparatus according to United States patent application Ser. No. 171,741, now Patent No. 3,261,463, hereinafter termed the "main application," this figure being included by way of explanation of the present improvements, FIGURE 2 a fragmentary sectional elevation illustrating a modified design of the drying and dedusting stage for the raw feed material, FIGURE 3 a plan of FIGURE 2, FIGURE 4 a modification of the construction shown in FIGURES 2 and 3, FIGURE 5 is a perspective view, with parts broken away for illustrative purposes, of a combined dryer-dry cleaner according to the present invention, FIGURE 5a a fragmental elevation illustrating a detail applicable to FIGURE 5, FIGURE 6 a diagrammatic sectional elevation showing the application of the invention to a construction similar to FIGURE 3 of the main application and embodying sensing mechanism mentioned hereinafter, FIGURE 7 a diagram depicting methods of controlling the mass flow rates of the gaseous medium, FIGURE 8 a diagram showing another method of controlling such mass flow rates, FIGURE 9 a diagram illustrative of methods of controlling the temperature of the gaseous medium, FIGURE 10 a diagram relative to an alternative method of providing the gaseous medium, FIGURE 11 a fragmental sectional elevation illustrating a modified construction of the perforate support of the fluidised bed of the separating or cleaning stage, FIGURE 12 a plane of FIGURE 11, FIGURE 13 a fragmentary sectional elevation showing another modified construction of the perforate support of the fluidised bed of the separating or cleaning stage, FIGURE 14 a part plan of FIGURE 13, FIGURE 15 a plan cross-section showing an example of multiple fluidised beds of discrete solid particles in a lower or cleaning stage, and FIGURE 16 a sectional elevation, corresponding to FIGURE 15, of the lower part of the fluidising vessel.

Figures 1, 8:
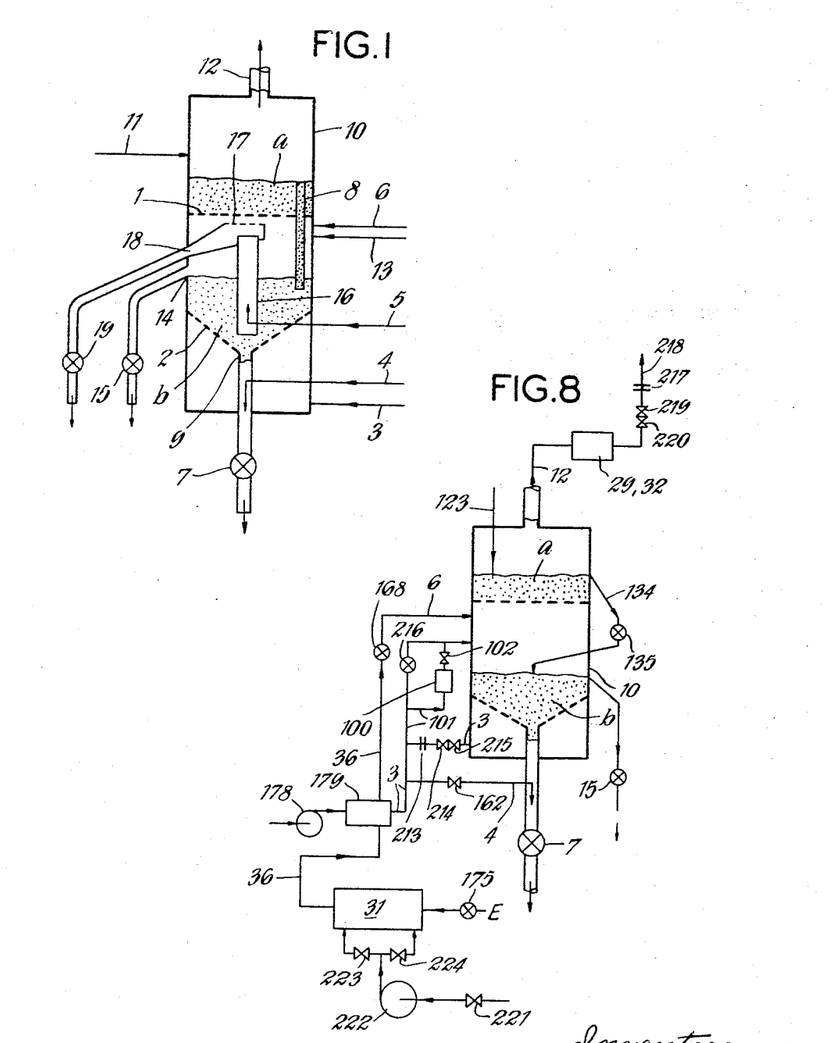

In the drawings, the apparatus illustrated in FIGURE 1 embodies a fluidising vessel 10 having perforate supports 1, 2 therein. On the support 1 raw material for treatment entered at 11, is formed into a fluidised bed $a$ for the purpose of drying and de-dusting the same. On the support 2 a fluidised bed $b$ of discrete solid particles is formed to serve as a separating medium for the dried and dedusted feed material which is transferred from bed $a$ to bed $b$ by overflow from the one bed to the other into and through a downcomer 8. The bed of separating medium at $b$ has a specific gravity intermediate between those of the relatively low-density and high-density components of the feed material and is effective to cause separation of the said material into fractions of different specific gravities. The "floats" product is removed from the bed $b$ by overflow at 14 and delivery past a gas-tight valve 15. The "sinks" product is discharged from the bed $b$ through a down-pipe 9 and past a gas-tight valve 7 therein, this pipe being supplied with heated gaseous medium at 4 to inhibit escape down the pipe of discrete solid particles from the bed $b$. The discrete solid particles are fed to the bed $b$ at 13, as desired so as to make-up for any removed with the separated fractions. They may be of magnetite, ferro-silicon or other suitable solid material which remains inert in the separating treatment and are hereinafter referred to simply as "magnetite" for convenience. After leaving the fluidising vessel the separated fractions are, of course, treated to recover discrete solid particles therefrom.

As will be realised, the apparatus shown in FIGURE 1 is similar to that described with reference to FIGURES 1 and 2 or FIGURES 3 and 4 of the main application though it may be used with or without the parts or elements 5 and 16 to 19, and with or without the modifications shown in FIGURES 5 and 6, of such application.

Concerning the series of features of the present invention, these will be exemplified in the following manner and under the headings given:

(a) *Design of the drying and de-dusting stage*

The raw feed, suitably pre-sized where necessary, is fed continuously into the fluidising vessel 10, at 11 or elsewhere, by a screw-type feeder, or a rotary valve, or a disc-type feeder, provided with a hopper or similar device for containing the raw feed and all being of known type needing no illustration. The heated gaseous medium passing upwards through the corresponding perforate support, such as 1, forms the raw feed into a fluidised bed on this support. The depth of this fluidised bed may be adjusted by changing the height of the overflow or weir such as 8, for the dried, or partially dried, de-dusted feed. As an alternative, optionally shown in FIGURE 5, the raw feed inlet to the fluidising vessel may take the form of a pipe 123, the lower end of which preferably, but not necessarily, is immersed in the fluidised bed of raw feed on the perforate support 1. The raw feed is introduced into the fluidised bed at some point, e.g., and as shown in FIGURE 5, diametrically opposite the overflow or weir at 8. This weir is shown adjustable for height of the overflow in FIGURE 5 by means of horizontal slats at 8′ fitted at each end in grooved posts 8″.

Figures 2, 4:
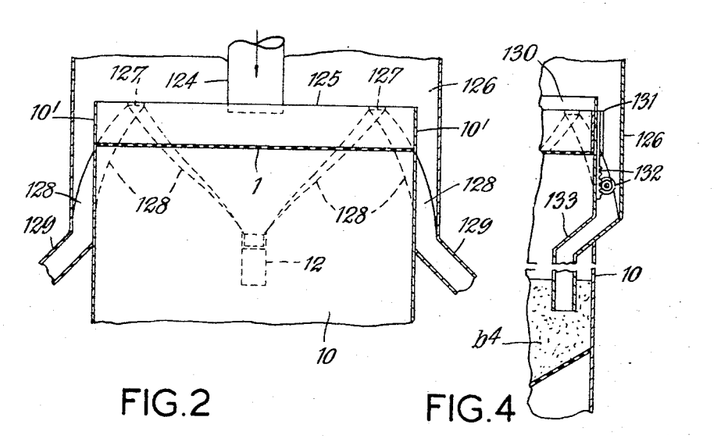
Figure 2:
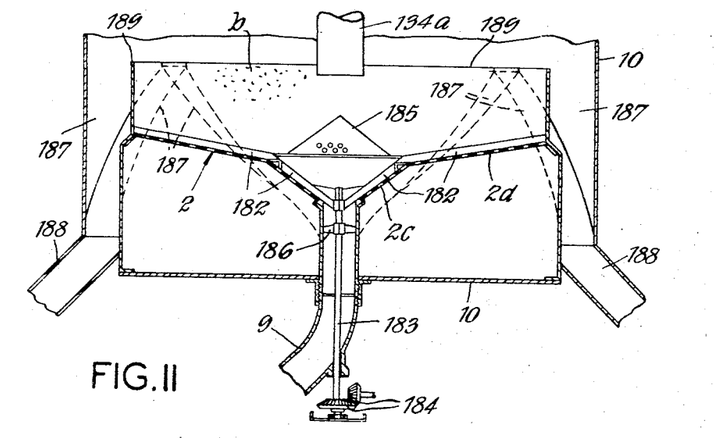
Figures 3, 6:
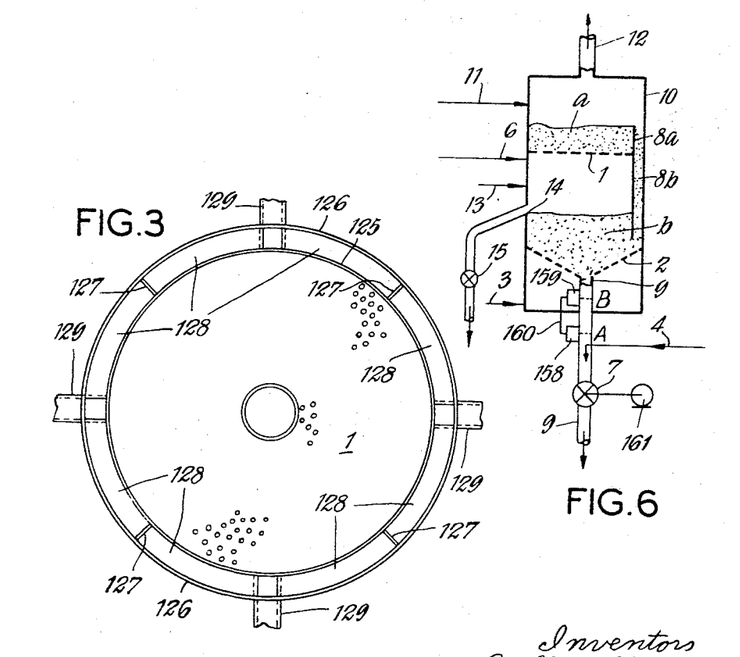

In the present stage, the modified design illustrated in FIGURES 2 to 4 is for use in cases where a single fluidised bed for drying and de-dusting the feed material is desired to be associated with more than one fluidised bed of magnetite in which the raw feed is separated or cleaned according to specific gravity differences existing between its component particles. The object in view is to provide for the product from the drying and de-dusting stage, to be divided into two or more equal streams, each stream going to its own fluidised bed of magnetite, and all the streams having the same size composition and specific gravity composition. According to FIGURES 2 and 3, the dried, de-dusted raw material is divided into four streams. Raw feed material is passed to the fluidising vessel 10, from a suitable feeding device, down a pipe 124 arranged on the vertical axis of the perforate support 1 of the fluidised bed (not shown) of raw feed particles. The lower end of this pipe preferably projects so as to extend below the surface of the fluidised bed and the feed material passes radially from its lower end to peripheral overflow at 125 from the bed at the top of the surrounding containing wall 10′ of the bed. During its travel, in fluidised condtiion, the feed is dried (or partially dried) and de-dusted. Provision can be made for adjusting the height, above the perforate support, of the top edge of the peripheral overflow 125, so that the depth of the fluidised bed may be adjusted. Material over-flowing the fluidised bed at 125 passes into a peripheral launder 126 surrounding the upper part of the fluidising vessel 10. This launder is shown broken away at the top for illustrative purposes, but actually is of hood form also constituting the top portion of the fluidising vessel. The launder is shown divided by radially disposed vertical plates 127 into four compartments. The bottom of each compartment slopes at 128 from the plate 127 at each top end to an outlet pipe 129. The slope at 128 must be sufficient to permit particles readily to pass to the outlet pipes 129. For the cleaning of coal, sized ½ in.– ½ mm., this slope could be within the range 40°–45° to the horizontal. The compartments of the peripheral launder correspond in number to the fluidised beds of magnetite employed for cleaning the dried, de-dusted feed. The peripheral overflow 125 may conveniently take the form of a weir composed of curved horizontal slats, co-extensive circularly with the whole periphery or with the individual said compartments, whereby the height of the overflow lip may be adjusted by adding or removing slats. Or, according to FIGURE 4, similar slats, one of which is shown at 130, may be slidable in vertical posts 131, and, if desired, be operated by racks and pinions diagrammatically indicated at 132. It is important that the height of all "active" portions of the peripheral overflow shall be substantially the same. The term "active" portions refers to those portions of the peripheral overflow over which particles pass into the peripheral launder. They may constitute the whole periphery or the whole arc of the periphery adjacent to each launder compartment, except for the aforesaid radial vertical plates 127 or that portion of the periphery taken up by locating posts such as 131. If it becomes necessary to take any one or more of the cleaning stages out of service, the supply of dried and de-dusted feed to such stage or stages may conveniently be interrupted by raising the level of the peripheral overflow adjacent to the compartment(s) of the peripheral launder 126 appertaining to the cleaning stage(s) in question. Particles passing from each launder compartment to its outlet pipe 129 are conveyed to the corresponding cleaning stage, that is, to the corresponding one of the fluidised beds of magnetite. Further, according to FIGURE 4, the particles from the compartments may be conveyed along pipes, such as 133, arranged internally with respect to the fluidising vessel 10, this pipe being open at the lower end and a satisfactory gas seal being established thereby immersing such lower end to the necessary extent in the corresponding fluidised bed $b^4$ of magnetite, the magnetite beds being at different levels in the fluidising vessel 10 or being smaller beds at one level therein. The outlet pipes 129, 133 may discharge the dried and de-dusted raw feed at a point on the vertical axis of their fluidised beds of magnetite or at any other appropriate point as the case may be. Alternatively, the outlet pipe connecting any launder compartment with its associated cleaning stage may lie, for part only of its length, outside the fluidising vessel as will be hereinafter described in section (b) hereof.

(b) *Method of transferring material from the upper (drying and de-dusting) stage to a lower (cleaning) stage*

In one method of the main application of transferring material from the upper to the lower fluidised bed, the whole of the dried and de-dusted product overflows a single weir at the periphery of the upper bed and passes to a single cleaning stage. However, the principle of this method is also applicable to the example described in section (a) above, i.e., the material passing from each compartment of the peripheral launder could be delivered to an associated cleaning stage. Under another application of this principle, the dried, or partially dried, de-dusted material overflowing the weir of the upper fluidised bed, or overflowed into each of the compartments of the peripheral launder, is first passed into a pipe situated outside the shell of the fluidising vessel. An example of such a pipe is seen at 134 in FIGURE 8 extending from the weir at 8 appertaining to the fluidised bed of raw feed which would form on the perforate support 1. Arranged in this pipe is a rotary gas seal 135, or some other suitable device, capable of passing the mass of particles flowing down the pipe whilst eliminating, as far as is practically possible, flow of gas countercurrent to the movement of the particles. On the outlet side of the seal or the like, the pipe 134 re-enters the shell of the fluidising vessel 10 in order that the particles may be delivered to the lower fluidised bed or beds of magnitite which would be formed on the perforate support 2. At all points along its length, the inclination to the horizontal of the pipe 134 is sufficient to ensure that particles will readily move down it under the influence of gravity.

(c) *Method of admitting dried (or partially dried), de-dusted feed material and magnetitie to a lower (cleaning) stage*

Figures 5, 5A:
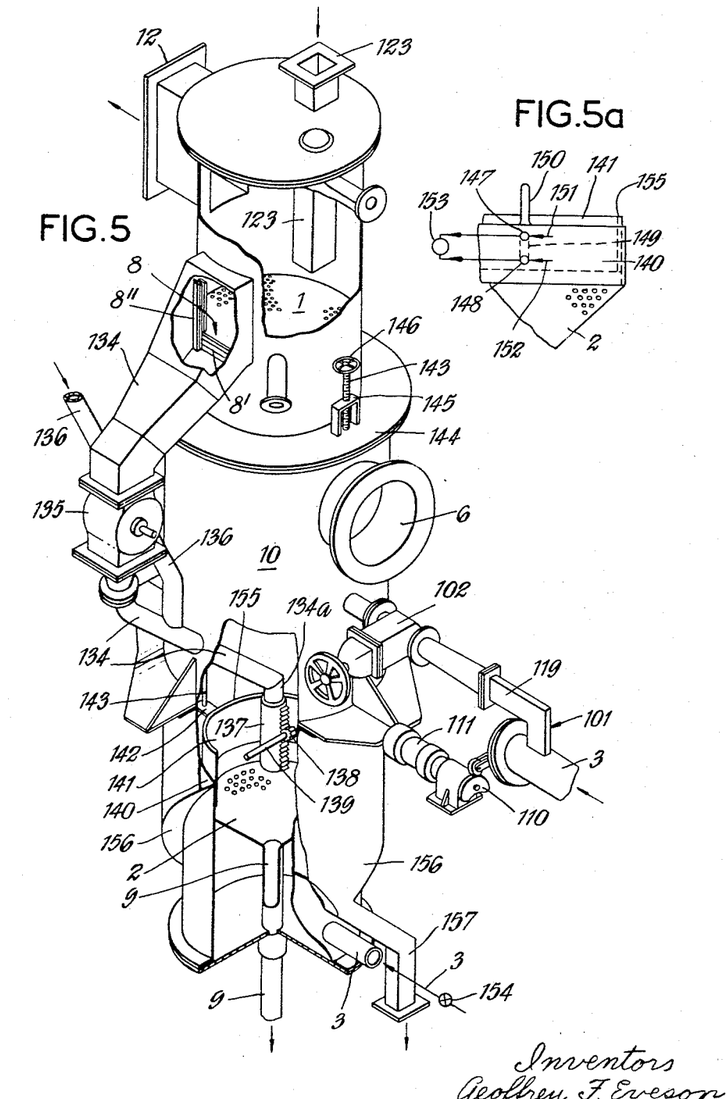

According to this method, and as shown for instance in FIGURE 5, the magnetite is admitted along a pipe 136 to the pipe 134 conveying the feed material from the seal 135 or the like to the lower fluidised bed of magnetite. The magnetite is fed to the pipe 136 from a hopper (not shown) at a controllable rate by means of a suitable device such as a screw-type or a disc-type feeder, or a rotary valve, which in each case, should eliminate, as far as possible, leakage of the gaseous medium from the apparatus at this point.

It is also desirable, in order to secure the optimum efficiency for the specific gravity separation of the feed material in the lower fluidised bed of magnetite, that the depth of immersion of the feed pipe within this fluidised bed should be adjustable. Suitably, the depth of the bed is also adjustable. Thus, the range of adjustment of the immersion should be sufficient to cover the interval over which the depth of the fluidised bed is adjustable plus the required variation of depth of immersion for any one value of the depth of the bed. One way of obtaining this immersion adjustment is indicated in FIGURE 5 wherein the feed pipe 134 carries, over its lowest vertical section 134a, a sleeve 137 which is a sliding fit over this section. Rack teeth on a portion of the surface of this sleeve mesh with teeth of a pinion 138 situated on a horizontal shaft 139. This shaft is mounted to pass over the top of an imperforate cylindrical section 140, which contains the sides of the fluidised bed above the conical perforate support 2, together with an adjustable portion 141 of such section which can be raised to give the greatest possible depth of the bed. The shaft would be passed through a gas-tight gland in the outer casing of the fluidising vessel 10 and terminate in a hand-wheel (not shown), fitted with a scale to indicate the vertical position of the sliding sleeve 137. Rotation of the hand-wheel enables the depth of immersion of the feed tube to be altered whilst the plant is operating, if this proves to be necessary. According to the manner, shown in FIGURE 5, of adjusting the depth of the fluidised bed of magnetite, the inverted conical perforate support 2 of this bed fixedly carries, at its circumference, the upstanding cylindrical section 140 which is of imperforate metal and is spaced all round from the inner wall of the outer shell of the fluidising vessel 10. A second cylindrical section of imperforate metal, i.e., the adjustable portion 141 aforesaid, is a sliding fit on or within the fixed shell, and its depth is slightly less than that of the fixed part 140. Two brackets, of which one is seen at 142, are welded, at opposite ends of a diameter, to the upper edge of the slidable part 141 and to each is fixed a vertical rod, such as 143, which is threaded at its upper end as shown of the companion rod, the upper end of the first rod being obscured by the pipe 134. The rods 143 each pass through a gas-tight gland in an upper cover 144 of the lower outer shell of the fluidising vessel 10 and engage a correspondingly threaded member 145 on such cover which has the form of a ledge. Rotation of a hand-wheel, such as 146, on the threaded section of each rod 143 enables the slidable part or shell 141 to be moved with respect to the fixed part or shell 140; the extent of the movement may be read from a suitable scale (not shown) associated with the hand-wheel. The minimum depth of the fluidised magnitite bed is achieved when the slidable shell 141 lies wholly within or about the fixed shell 140. The maximum depth is achieved when the sliding shell is raised to its fullest extent, whilst providing an effectively continuous vertical wall to the perforate support 2.

As shown in FIGURE 5a, two pressure tappings 147, 148 may be placed, at an accurately known distance apart, in the wall of the fixed cylindrical shell 140. A slot 149 is milled out of the slidable shell so that these pressure tappings are not covered by it when the lower edge of such shell is at a predetermined position below the upper edge of the fixed shell 140. A vertical metal strip 150, attached to the upper edge of the fixed shell, seals the slot 149 in the slidable shell, preventing escape of magnetite and cleaned coal through the slot when the upper end of the slot is above the top edge of the fixed shell. The purpose of these pressure tappings is hereinafter described in section (f)(2).

(d) *Method of removing the fraction of lower specific gravity, together with its associated magnetite, from a lower (cleaning) stage*

According to this method, instead of the cleaned coal product plus its associated magnetite overflowing from only a portion or portions of the perimeter of the fluidised bed of magnetite, they are caused to overflow the whole of the periphery of this fluidised bed as is possible in the construction shown in FIGURE 5. For this purpose, and as illustrated by FIGURE 5, the feed of dried and dedusted raw material to the bed is preferably effected through a feed pipe, e.g., 134a aforesaid, arranged concentrically of the bed or substantially so. The method presents advantage because:

(i) Each particle of the cleaned coal product, moving radially outwards from the centrally submerged end of the feed pipe 134a of the fluidised bed can travel approximately the same distance before overflowing the discharge lip 155 at the periphery of the bed, FIGURES 5 and 5a.

(ii) The cross-sectional area of the fluidised bed of magnetite is used more effectively for the cleaning operation. If the cleaned coal were discharged from only a portion of the periphery and the feed material were admitted at a point on, or near to, the vertical axis of the fluidised bed, the portion of such bed lying to that side of the feed pipe remote from the discharge from the bed probably would receive less of the feed material than it could handle.

Cleaned coal and magnetite passing over the peripheral discharge lip 155 pass into a launder 156, the base of which is sloped towards one or more offtake points, as at 157. The arrangement may be somewhat similar to the launder referred to in connection with FIGURES 2 and 3. From the or each offtake point, the solids would pass through a mechanical or other gas seal to the cleaned coal screen.

(e) *Sensing mechanism for controlling the rate of extraction of the fraction of higher specific gravity, together with its associated magnetite, from a lower (cleaning) stage*

An example of the application of such a mechanism for sensing the level of solids in the down-pipe 9 leading the components of higher specific gravity from the fluidised bed or beds of the cleaning stage, is shown diagrammatically in FIGURE 6 and corresponds to the arrangement described with reference to FIGURE 3 of the main application. Various combinations of instruments can be used for such purpose. For instance, an ultrasonic sensing unit 160 may be employed comprising sensing devices 158, 159 arranged respectively at the levels A, B, in pipe 9. This unit usually gives rise to an electrical output signal but this electrical signal can be converted into a pneumatic, or a hydraulic, signal if this course be considered desirable. Conversely, a pneumatic signal emanating from a sensing device may be converted to an electrical signal. In each case, the signal could be used to control or actuate a variable-speed or multi-speed motor 161 operating a discharge device, e.g., a rotary valve 7, in the down-pipe 9. Incidentally, in FIGURE 6, 8a represents a chord-type overflow weir for the fluidised bed *a*, this weir forming a segmental-section downcomer 8b leading into the lower fluidised bed *b* as in the main application.

(f) *Methods of controlling the mass flow rates of gaseous medium to various parts of the apparatus*

Figure 7:
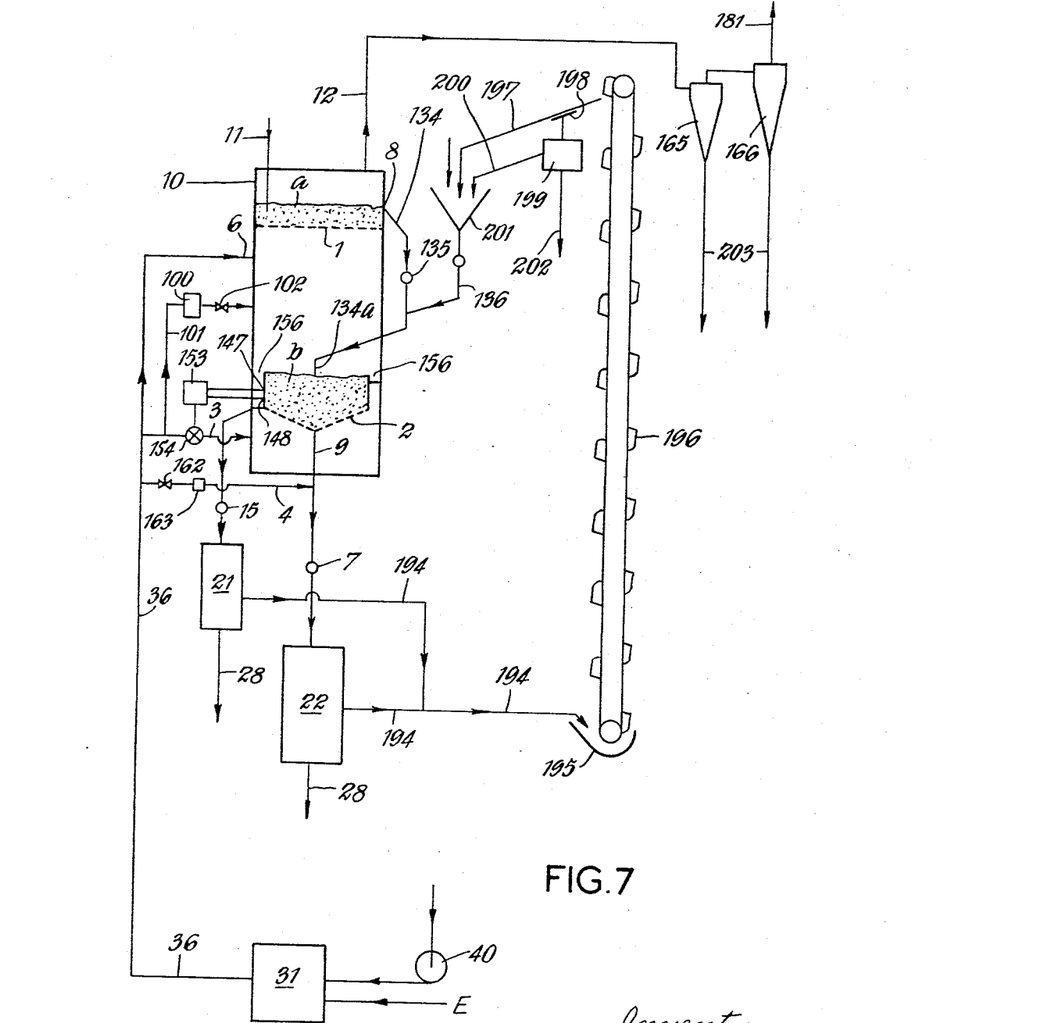

Suitably there are three flow rates to be controlled and these may be dealth with manually or automatically. Suitably, and as illustrated by FIGURES 5a, 7 and 8, one is controlled manually and two automatically as follows:

(1) The flow rate of the gaseous medium admitted at 4 into a down-pipe 9 from the fluidised bed of a cleaning stage at *b* in a manner to maintain the interstitial spaces of a column of the fraction of higher specific gravity in such down-pipe substantially free from the magnetite passing with this fraction from the bed. In this case, the mass flow rate of the gaseous medium may be controlled manually by means of a valve 162, FIGURES 7 and 8. The actual flow rate may be measured by means of an orifice plate, or a rotameter, or similar known device 163, in the line 4 between the valve 162 and the down-pipe 9 as shown in FIGURE 7. Instead of using a heated gaseous medium for this purpose, it may sometimes be convenient for air, delivered by a blower, to be used alone or mixed with heated gaseous medium.

(2) A flow rate desirable in order to enable the effective specific gravity of the fluidised bed *b* of magnetite of a cleaning stage to be maintained constant at a given pre-determined, and adjustable, value. To achieve this, one of the conditions to be satisfied is that the mass flow rate of gaseous medium through the perforate support 2 of the bed should remain constant, even though the temperature and pressure of this medium may vary. As already shown in FIGURE 5a, two pressure tappings 147, 148 are sited, a known distance apart, in the fixed cylindrical wall 140 of the fluidised bed (see section (c) above). The pressure differential existing between these tappings is a measure of the effective specific gravity of the fluidised bed of magnetite. Purging air can be admitted to each tapping as at 151, 152, to prevent it becoming blocked with solid particles. The pressure differential is applied to a differential pressure indicator and controller 153, FIGURES 5a and 7, and the output signal from the controller is used to position the butterfly valve 154 in the feed line 3 for gaseous medium entering the fluidising vessel 10 at point below the fluidised bed (see also FIGURE 5). As long as the pressure differential existing between the tappings 147, 148 coincides with the value set on the controller 153, the position of the butterfly valve 154 remains unchanged. If the existing pressure differential exceeds the control value, indicating that the effective specific gravity of the fluidised bed of magnetite exceeds the desired value, the butterfly valve is automatically opened to admit more gas at 3 below the perforate support 2, until the pressure differential (and, therefore, the effective specific gravity) has decreased to the desired value. Conversely, if the existing pressure differential is less than the control value, indicating that the effective specific gravity of the fluidised bed of magnetite is less than the desired value, the butterfly valve 154 is automatically closed to reduce the amount of gaseous medium admitted below the perforate support 2, until the pressure differential (and, therefore, the effective specific gravity) has increased to the desired value.

An alternative and preferred system for controlling the mass flow rate of gas to the fluidised bed of magnetite is illustrated by FIGURE 8.

The effective specific gravity of the fluidised bed of magnetite is determined by the mass flow rate of gas passing through it; this statement assumes that the size composition and the specific gravity composition of the magnetite remain constant. The following system compensates for fluctuations in gas temperature and pressure, which will inevitably occur, so that a constant true mass flow rate may be maintained.

An orifice plate 213 is installed in the gas line entering the fluidising vessel 10 at 3. The pressure differential generated across this orifice plate is fed into an air flow indicator which has an electrical output signal proportional to the input pressure signal. The temperature and absolute pressure of the gas are measured by means of a resistance thermometer 214 and a pressure transducer 215. The electrical outputs from the air flow indicator, resistance thermometer and pressure transducer are fed into a computing, indicating, mass flow recorder/controller, equipped with three-term control, and, preferably, an auto/manual station. The pneumatic output signal from the controller is used to operate a diaphragm control valve 216 in the by-pass line 101, leading to the gas space between the two fluidised beds. This electronic control system enables the true mass flow rate of pulsed gas through the fluidised bed of magnetite to be maintained constant at any pre-set value of magnetite to be maintained constant at any pre-set value within a suitably wide range. Within two seconds, the effective specific gravity of a fluidised bed of, say, magnetite can be changed from the maximum to the minimum value (or vice versa) which can be achieved (approximately 1.7–2.3).

It will be seen that both FIGURES 7 and 8 comprise means 100, 101 and 102 for operation of the gaseous medium in pulsed manner in the bed *b* according to patent application No. 289,309, now Patent No. 3,288,282 dated Nov. 29, 1966.

(3) A flow rate desirable in order that the raw feed may be de-dusted efficiently at a pre-determined particle size. For this purpose, it is important that the mass flow rate of gaseous medium through the upper perforate support 1 for the fluidised bed *a* of raw feed material should remain constant, even though the pressure and temperature of the medium may vary. Referring again to FIGURE 8, the gas flow rate may be measured by an orifice plate 217 installed at a point in the circuit where gas-temperature and pressure variations are at a minimum e.g., at the waste gas outlet 218 from the system to the atmosphere beyond the devices 29, 32. The pressure differential generated across the orifice plate is fed into an air flow indicator which has an electrical output signal proportional to the input pressure signal. The temperature and absolute pressure of the gas are measured by means of a resistance thermometer 219 and a pressure transducer 220. The electrical outputs from the air flow indicator, resistance thermometer and pressure transducer are fed into a computing, indicating, mass flow recorder/controller equipped with three-term control and, preferably, an auto-manual station. The pneumatic output signal from the controller is used, for example, to operate a power cylinder connected to a "radialeaf" damper 221 at the inlet to a low-pressure gas-medium (air) supply blower 222. This electronic control system enables the true mass flow rate of gas through the upper fluidised bed of raw coal to be maintained constant at any pre-set value within a suitably wide range.

As long as the recorded mass flow rate is the same as that for which the controller has been set, the position of the "radialeaf" damper 221 remains unchanged. When the recorded value exceeds, or is less than, the pre-set value, the damper is closed, or opened to the necessary extent.

(g) *Method of controlling the temperature of the gaseous medium used*

It is important to ensure that the hot gaseous medium is at a temperature above the dew point at each point of the apparatus. This objective may be achieved by measuring the temperature of the gases in the space of the fluidising vessel 10 above the upper fluidised bed *a* or in the gas line 12 leading therefrom to dust collection equipment. This temperature conveniently may be measured by a thermocouple or a thermometer at 172 in FIGURE 9. The dew point of the gases above such fluidised bed may be calculated approximately, for normal operating conditions, from a knowledge of the rate at which water is to be evaporated from the raw feed, the mass flow rate and the humidity of gaseous medium (air) supply entering the apparatus, the chemical composition of the fuel used in the furnace 31 employed for heating the gaseous medium, and the rate at which fuel is burned. The temperature of the gases above the upper fluidised bed *a* is maintained at a value considerably above this calculated dew point; then, an increase in the moisture content of the raw feed, which would result in an increase in the percentage relative humidity of the gases, may be accommodated whilst still maintaining the gas temperature above the dew point.

Normally, when treating raw coal sized within the range 1 inch–0, provision would be made to control the temperature of the gases above the upper fluidised bed at a selected value within the range 140°–200° F.

When a gaseous or liquid fuel is used as the heat source in the furnace 31, the temperature of the gases at the measurement point 172 may be maintained at a constant value in one of a number of ways, including the following: (1) The temperature is measured by means of a suitable thermocouple (e.g., iron/constantan) operating in conjunction with an electronic temperature indicator fitted with pneumatic control mechanism at 173. The output from this controller over line 174 would be used to position a diaphragm valve at 175 in the fuel supply line E to the furnace 31. (2) The thermocouple E.M.F. can be applied at 173 to a blind electronic controller having a 0–10 milliampere output for connection to an electro-pneumatic converter. The converter would adjust the 0–10 ma. to a 3–15 p.s.i. output, which would be applied to the diaphragm control valve 175. (3) The temperature may be measured by a mercury-in-steel thermometer at 172 fitted with a dial and pointer, to indicate the measured temperature, and a length of capillary tubing and the electrical contacts necessary to operate a motor linked to a micro-cam control valve at 175 in said fuel supply line E. (4) The temperature may be measured by a mercury-in-steel thermometer at 172 fitted with a dial and pointer, as above, and a length of capillary tubing. This instrument is used to control a suitable fuel control valve (e.g., of the Magservo type), fitted with adjustable high and low by-pass settings, placed at 175 in the fuel supply line E to the furnace. (5) The output from the controller 173 may be used to adjust the rate of feed of the pulverised coal as fuel to the furnace 31. (6) Finally, according to FIGURE 8, a pneumatic ratio relay, providing a form of air/fuel ratio and utilising the control signal from the pneumatic controller 173 previously mentioned, may be incorporated in the control circuit. The ratio relay output actuates power cylinders connected to butterfly valves 223, 224, respectively, in dilution—and primary—air lines to the furnace from the blower 222. These butterfly valves are arranged to operate in opposition to each other. Increases in the rate of combustion of fuel lead automatically to an increase in the supply of primary air; the dilution air supply is correspondingly decreased to maintain a constant total flow of air and, therefore, a constant pressure drop across the furnace itself.

Figure 9:
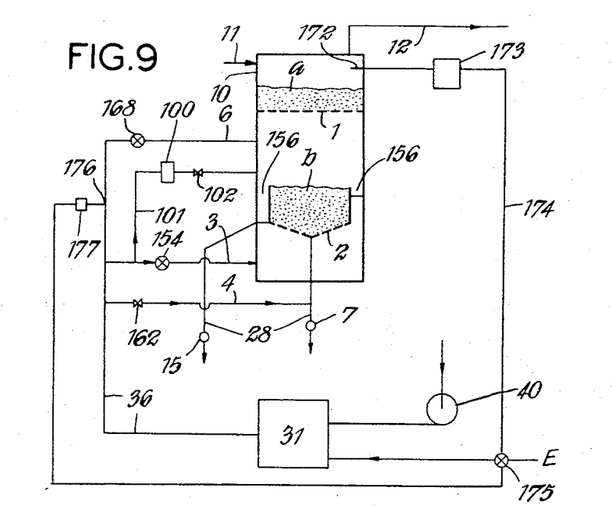

It is also desirable to measure the temperature of the gaseous medium at an advance point 176 in the delivery line 36 from the furnace 31, cf., FIGURE 9. Should the measured temperature exceed a pre-set value, the fuel supply to the furnace is automatically switched off, suitably by causing the valve 175 in the fuel supply line E to close.

The temperature control systems would operate as follows: When the rate of feed of the raw material to its fluidised bed *a* is steady and when the moisture content of this feed is constant, the condition of the valve at 175 or other above devices in the fuel supply line E will be such that the temperature of the gases in the space above such fluidised bed is maintained at the pre-determined value set on the controller 173. An increase in the rate of feed, an increase in the moisture content of the feed, a decrease in the mass flow rate of gases, or in any combination of these factors (all other factors being maintained at their previous levels), will cause the measured temperature at the test point 172 above the fluidised bed *a* to decrease. The controller 173 then acts in a manner such that the valve or the like 175 in the fuel supply line E to the furnace 31 opens or otherwise operates to increase the temperature in the gas line 36 from the furnace to an amount sufficient to cause the temperature at the test point to rise to the desired, pre-determined value. However, if, in order to maintain the temperature at the test point 172 at the desired value, the temperature measured at the advance point 176 in the gas line 36 from the furnace increases above the value (considered to be the maximum safe temperature) pre-set on a measuring/control instrument 177 sited at such point, the fuel supply to the furnace 31 is shut off. It can be arranged that, when this sequence of events occurs, the feeding device admitting raw feed to the fluidising vessel 10 at 11, 123 or 124 is stopped.

A decrease in the rate of feed, a decrease in the moisture content of the feed, an increase in the mass flow rate of gases, or in any combination of these factors (all other factors being maintained at their previous levels), will cause the measured temperature at the test point 172 to increase. The controller 173 then acts in a manner such that the valve or the like 175 in the fuel supply line E closes, or otherwise operates to decrease the temperature in the gaseous medium line 36 from the furnace 31 to an amount sufficient to cause the temperature at such test point to fall to the desired pre-determined value.

(h) *Alternative method of providing the heated gaseous medium required*

Figure 10:
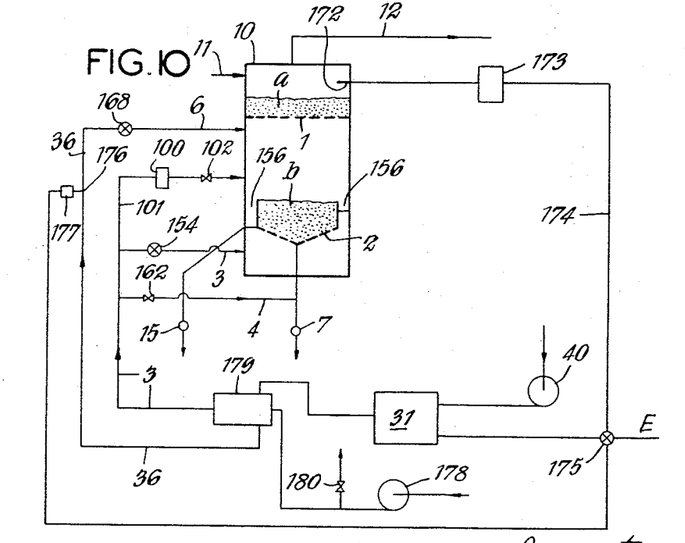

Instead of deriving the gaseous medium from one common gas line issuing from a furnace such as 31, a saving in electrical power used for compressing the air supply to the apparatus can be attained from a consideration of the fact that the heated gaseous medium supplied to the fluidising vessel at a point beneath the fluidised bed of raw coal need only be at a pressure considerably less than that of the gaseous medium supplied at points below the cleaning bed or beds and in the down-pipe or pipes 9 for the discard product of such bed or beds by reason of the resistances to flow through the apparatus experienced by these several gas streams. The mass flow rate of gaseous medium admitted at the first point generally will be greater than the combined mass flow rates of gaseous medium admitted at the other points. In the alternative method, therefore, and as illustrated in FIGURE 10, air is supplied by the furnace blower or fan 40 at a mass flow rate and at a pressure suitable for use in preparing the heated gaseous medium supply to the first point, served by 6 in the drawing. The whole of the heat necessary for operation of the plant is admitted, in the form of solid, liquid or gaseous fuel to the furnace 31. Another blower or fan 178 supplies air at a pressure (higher than that generated by the first blower or fan 40), and at a mass flow rate suitable for use in preparing the hot gaseous medium supply to the other points served by 3 and 4. This air is heated, in a heat exchanger 179, from the gases leaving the furnace 31 before passing by 3 to the fluidising vessel 10. Provision may be made to bleed to atmosphere, through a valve 180, any surplus air delivered by the second blower or fan 178.

In arrangements where only one blower or fan is used, as at 40, a considerable pressure drop is caused to occur across the butterfly valve 168 in the line leading from the blower or fan to the point beneath the upper fluidised bed, in order that the required gas pressures may be achieved in the various portions of the plant. This procedure is wasteful of electrical power. In FIGURE 10 the use of two blowers or fans 40, 178, operating with different delivery pressures, enables the required gaseous medium pressures to be achieved in the various portions of the plant without incurring such a large pressure drop across the said valve. A similar arrangement appears in FIGURE 8.

(i) *Method of handling the dust-laden gaseous medium leaving the fluidising vessel (cf. FIGURE 7)*

Solids are suitably removed from the dust-laden gas in primary and secondary cyclones 165, 166 from which the gas content all finally passes at 181 to atmosphere containing only an acceptably low concentration of the finest solid particles. There need be no re-circulation of the gas. Obviously, other dust collection equipment (e.g., bag filters or wet scrubbers) could be used to treat the gas leaving the secondary cyclone(s) (or leaving the primary cyclone(s), omitting the secondary cyclones) if this were necessary.

Flow of gas through the plant is preferably achieved by the blower or blowers aforesaid alone, so that at all points within the plant the pressure may be greater than atmospheric. However, an exhauster fan may additionally be used in the outlet 181 if required by the nature and handleability of the raw feed material, so that at some point within the plant (probably just above the level of the upper fluidised bed of raw coal) the pressure is equal to atmospheric pressure.

(j) *Design of the perforate support for a lower (cleaning) stage*

An improved design comprises the use of mechanical devices to assist the motion of particles of the discard product, once they are deposited on the upper surface of the lower perforate support, towards the discharge port or ports, i.e., to the down-pipe or pipes 9.

If the discard particles are to move, without mechanical assistance, towards the discharge port(s) the surface of the lower perforate support must be inclined to the horizontal at an angle greater than a minimum lying within the range 30°–45°; the exact value of this minimum angle of inclination depends upon such factors as the coefficients of static and sliding friction between the particles of discard product and the surface of the perforate support; the shape, size and specific gravity of the particles of discard product; and the effective specific gravity of the fluidised bed of particles above the perforate support. For this reason, it is considered that the maximum depth of the fluidised bed, lying wholly within the surface of a conical perforate support (and neglecting the depth of the cylindrical portion of the fluidised bed), may become excessive when the diameter of the base of the cone exceeds about two feet.

It is possible, though sometimes inconvenient, to use a multiplicity of cleaning stages each of which has a diameter less than about two feet. Alternatively, a mechanical device may be used, in conjunction with a form of perforate support differing from a simple cone, with perforate supports having a diameter greater than, say, two feet.

Figure 12:
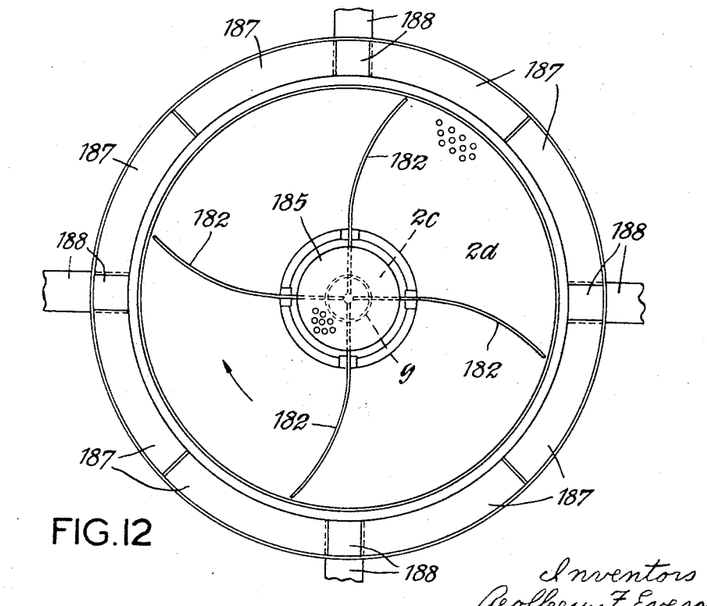

In one example of such a device, shown in FIGURES 11 and 12, the perforate support 2 is of generally inverted-conical form composed of adjoining inner and outer annular sections 2c and 2d respectively inclined to the horizontal at differing angles. The inner section 2c, which may have an external diameter of, say, 6–24 inches, is inclined to the horizontal at an angle lying, for example, within the range 25°–45°. The outer section 2d is inclined to the horizontal at an angle lying, for instance, within the range 0°–20°.

The upper surface of the support 2 is swept by a slowly-rotating rake mechanism comprising, for example, four equally spaced-apart rakes 182 carried at the top of a vertical shaft 183 sited axially in the down-pipe 9 through which passes the whole of the discard product or fraction, together with its associated magnetite. This shaft is driven through suitable gearing 184 from a variable speed motor. The rakes 182 curve forwardly in the direction of rotation as shown by the arrow in FIGURE 13, and their lower edges run just clear of the upper surface of the perforate support 2c, 2d, so that, as the rakes rotate, particles of discard product are guided to the central down-pipe 9. A perforate cone 185, attached to the rake mechanism, distributes within the fluidised bed *b* gaseous medium admitted into the down-pipe 9 for purpose aforesaid. A bearing carried on a spider-type structure 186 is used to locate the upper end of the shaft 183 in the down-pipe, which may be suitably enlarged so that the cross-sectional area presented to the stream of discard product may be substantially the same as the cross-sectional area in the unobstructed portions of the said pipe. A compartmental peripheral launder 187 with outlets 188 (of similar nature to that shown in FIGURES 2 and 3 for the upper fluidised bed) is provided for collecting cleaned coal plus magnetic overflowing the fluidised bed.

Application of a perforate support of the above design is limited by the volume of the discard product or fraction entering the fluidised bed *b* in a given time. Using a centrally-placed feed point 134a, the majority of the discard product will be deposited near to the centre of the support and the amount of such product deposited in a given time will tend to decrease in volume outwards from the centre, towards the peripheral overflow 189, of the support 2. However, all of this discard product has to be moved towards the one centrally-placed discharge down-pipe 9.

Figure 13:
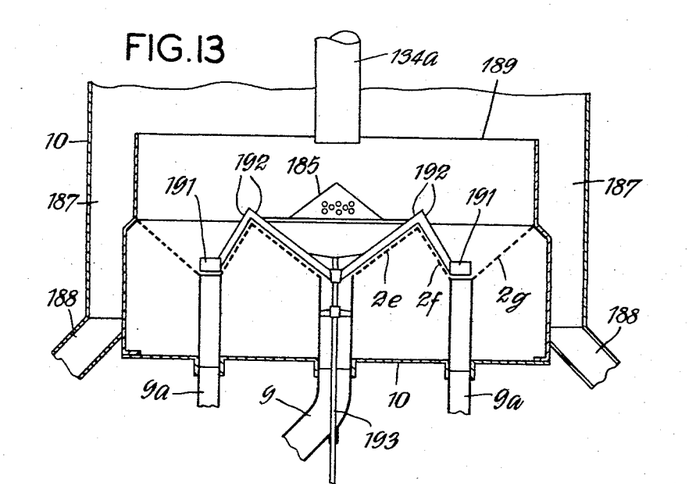
Figure 14:
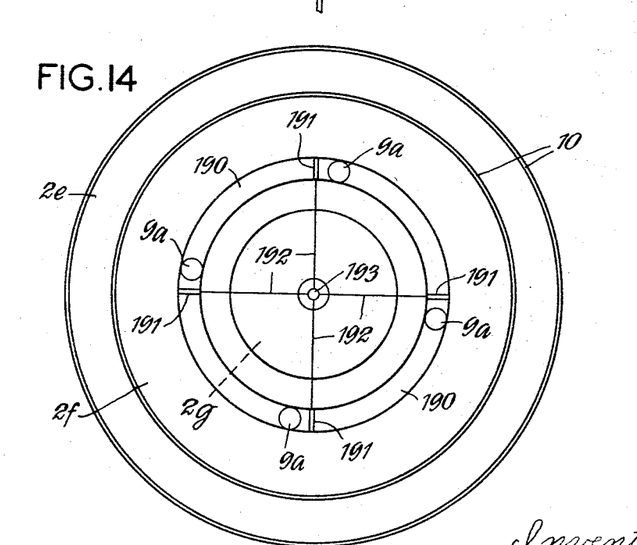

According to FIGURES 13 and 14, the capacity of the process for handling the discard product may be increased by adopting for the lower fluidised bed, a modified design of perforate support 2 having three annular surfaces 2e, 2f and 2g inclined to the horizontal at angles sufficiently large to enable particles of discard product to move over the surfaces under the influence of gravity. For example, typical values for the ranges of the three angles to the horizontal, proceeding outwardly, may be =25°–45°, =0°–60° and =25°–45° respectively. The discard product and associated magnetite may be withdrawn through a central down-pipe 9 and one or more additional down-pipes 9a leading from a flat perforate annular ring 190 disposed between the outer annular surface 2g and the next adjacent one 2f. Particles of discard product find their own way into the trough between these two annular surfaces and are then swept to the inlet(s) to the corresponding down-pipe(s) by a number of paddles 191 at the end of radial arms 192 attached to a vertical shaft 193 disposed axially within the central down-pipe 9 and driven by means similar to that of the shaft 182 of FIGURES 11 and 12. The inlet to each of the additional down-pipe(s) 9a has a conical form, the diameter of the base of the cone being equal to the width of the flat annular ring 190. Gaseous medium is admitted to the column of discard product maintained in each of these down-pipes in the same manner as has been described above in regard to the central down-pipe 9. Again, a perforate distributor (such as 185, not shown in FIGURE 14, though smaller), may be placed above the inlet to each of the said additional down-pipes 9a, in a manner which does not interfere with the motion of the paddles 191, in order to distribute within the fluidised bed gaseous medium which is admitted to each pipe.

Obviously, the system just described may be modified so that the three sloping surfaces 2e, 2f and 2g are less steeply inclined to the horizontal, necessitating the use of a rake-type mechanism similar to 182 aforesaid which assists the movement of discard particles to the central and additional down-pipes. For example the arms 192 may be modified to be curved similarly to the rakes 182 in FIGURES 11 and 12.

(k) *The use of launders, fitted with perforate bases, for conveying dried, de-dusted raw feed and cleaned coal*

The peripheral launders 128 (FIGURES 2 and 3) and 187 (FIGURES 11 to 14) which respectively receive dried, de-dusted raw feed overflowing the upper fluidised bed, and cleaned coal with associated magnetite overflowing from the fluidised bed of the cleaning or separating stage or stages, occupy considerable headroom, since the base of each compartment in these launders must be inclined at an angle sufficient to permit particles to flow down the launders, to the off-take points, under the influence of gravity.

However, the angle of inclination of these peripheral launders may be reduced considerably (e.g., the inclination to the horizontal may be within the range of 5°–20°) by using a perforate material (e.g., sintered metal, or porous ceramic) to form the base of the launders and passing sufficient gaseous medium upwards through the perforate base to fluidise the bed of particles formed on the base. In a fluidised condition, the particles will flow down a slope which is relatively slightly inclined to the horizontal.

Gaseous media used for fluidising the cleaned product in the launders, and its associated magnetite, can be constrained to pass upwards to join the gas stream passing through the upper perforate support to dry and de-dust the raw feed. The adoption of fluidised conveying for the cleaned fraction of the treated material in the launders therefore does not necessarily increase the total quantity of gaseous medium which has to be supplied to the fluidising vessel. However, gaseous medium used for fluidising the dried and de-dusted raw feed, overflown from the upper bed, in the peripheral launders cannot be used in the drying and de-dusting operation and, represents an extra quantity of gas which must be admitted to the fluidising vessel. It can, of course, still pass forward to the gas cleaning equipment.

(l) *Method of dealing with the separated products of the cleaning*

Suitably, in dealing with the separated products of the cleaning, and as shown, for instance in FIGURE 7, the cleaned coal product and its associated magnetite overflowing from the fluidised bed *b* of a cleaning stage is passed through a mechanical seal 15 or the like onto a screen 21. At the latter, the oversize product consists mainly, or wholly, of cleaned coal product (as before defined) which is discharged at 28 while the undersize product consists of magnetite contaminated with finely-divided material derived from the raw feed solids. This undersize product is passed forward at 194 to the boot 195 of a bucket elevator 196. Discard product and its associated magnetite is also passed through a mechanical seal 7 or the like on to a second screen 22. This screen yields an oversize product consisting mainly, or wholly, of discard product (as before defined) which is discharged at 28 and an undersize product consisting of magnetite contaminated with finely-divided material derived from the feed solids. This undersize product is also passed forward at 194 to the boot of the bucket elevator. When treating certain raw feeds (e.g., some coals) it may be desirable to screen the discard product into two, or more, size fraction and mix the finest (or the finest and the next coarsest) size fractions with the cleaned coal product. For this purpose, the screen last-mentioned may be a multi-deck screen (or two screens, each having one or more decks, may be used) to produce the required size fractions of discard product and the contaminated magnetite fractions referred to above.

Material is discharged at the top of the elevator 196 on to a chute 197, in the base of which is a hinged or sliding door 198. Adjustment of the position of this door enables a portion, or the whole, of the material to pass to a dry magnetic separator 199. The magnetic product from this separator is passed at 200 to a hopper 201 for return at 136 to the lower fluidising vessel. The non-magnetic product is passed from the separator at 202 for disposal in one of a number of ways hereinafter described. That portion of the contaminated magnetite which is not treated in the magnetic separator is also passed by the chute 197, into the hopper 201 for return to said fluidising vessel.

The non-magnetic product may be:

(i) Mixed with the solids recovered in the primary and secondary cyclones 165, 166 or (ii) Mixed with either the cleaned coal or discard products.

The mixture, as at (i) above, or the product passed at 203 from the secondary cyclone, or the combined products passed at 203 from the primary and secondary cyclones, may be used as the fuel supply to the furnace aforesaid when a raw coal is being treated in the apparatus; these various solids products may, or may not, require grinding to a small particle size before being used as pulverised fuel.

(m) *The shape of the perforate supports, in plan view*

The perforate supports described are of circular shape in plan view and this should apply in those cases where a mechanical device is used to aid movement of particles over the upper surface of the perforate supports.

However, it is possible to give the upper perforate support and also the lower perforate support(s) (when particles of discard product move under the influence of gravity alone), square, rectangular, hexagonal, octagonal or elliptical shape in plan view. The principle of peripheral overflow from fluidised beds formed above such perforate supports can still be adopted. Launders, fitted with perforate bases, may also be utilised in the manner already described.

(n) *Multiple arrangement of fluidised beds in a lower (cleaning) stage*

Figure 15:
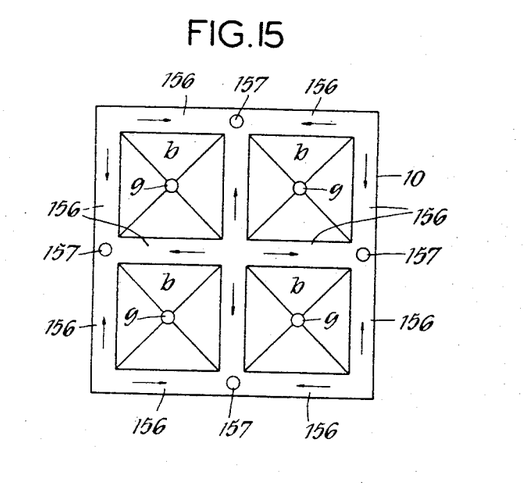
Figure 16:
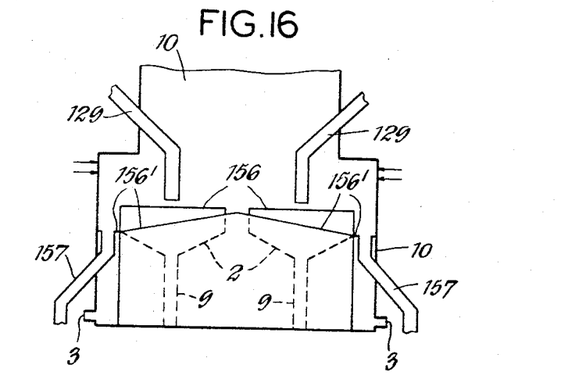

Mention has already been made of an arrangement of this nature in section (a) hereof. In the example shown in FIGURES 15 and 16, the fluidising vessel 10 is of square cross-section and, in the lower part, has four perforate supports 2, each square in plan, for a similar number of fluidised beds *b* of magnetite. The feed pipes to the beds, for dried and de-dusted particulate material, are numbered correspondingly to the feed pipes 129 of FIGURES 2 and 3 and the outlets 157 for cleaned material and magnetite, by way of launders 156, are of similar nature to that shown in FIGURE 5. The pipes 129 may each correspond to the one shown at 134 in FIGURE 5 and be fitted with a gas seal, as 135 in that figure. The cleaned material overflows the whole periphery of the beds into the launders 156 of which the floors 156' may be perforate and slope to the outlets 157 and act as "air slides" for the overflowed material, the air being gaseous medium supplied to the fluidising vessel at the locations 3 and serving the purpose aforesaid in the launders. The downpipes 9 are similar to those already described.

(o) *Design of the mechanism for pulsing the gaseous medium supplied beneath the perforate support of the fluidised bed(s) of magnesite*

This design follows that of the nature described in United States patent application Ser. No. 289,309, now U.S. Patent No. 3,288,282, aforesaid. The parts shown at 100, 101, 102, 110, 111 and 119 in the accompanying drawings represent one example of this design and correspond to similar parts shown, numbered and described in said patent applications and reference is directed thereto for further explanation of same.

(p) *General*

It is possible to adopt the feature above described in connection with any of the process and apparatus aspects of the main patent application aforesaid where applicable. Modifications of those aspects are also possible.

Finally, an important trend in the development of the invention of the main application aforesaid, would appear to be associated with the introduction of a peripheral discharge for either or both the drying/de-dusting stage (section (a) or (b) above), and the cleaning stage (section (d) above), and importantly overflow discharge at the whole periphery of the bed of the cleaning stage (section (d)). The various modifications of, or additions to, the earlier invention, however, each appears to have its own individual application though they may some or all be applied in combination in the carrying out of such invention.

We claim:

1. A process for cleaning impure small coal or other particulate material, having components of different specific gravities including components of relatively high and low specific gravities, comprising delivering said material into a first fluidised bed formed by said material itself to effect a drying and de-dusting of said material, discharging said material from said first fluidised bed by overflowing therefrom at substantially the whole periphery of said bed, delivering said discharged material to at least one further fluidised bed composed of discrete solid particles having a specific gravity intermediate that of said high and low specific gravity components, maintaining said further fluidised bed in a fluidised condition by a gaseous medium applied thereto from below in such manner as to give and retain in said further bed a specific gravity effective to cause separation of said material into components of relatively high and low specific gravity, the low specific gravity component being caused to discharge from said further bed by overflowing therefrom at substantially the whole periphery thereof.

2. A process according to claim 1, wherein the material discharged from said first bed is delivered to said other bed substantially at the middle thereof.

3. Apparatus for cleaning impure small coal or other particulate material having components relatively of high density and low-density, comprising a fluidising vessel, a first gas-pervious support in said vessel, a second gas-pervious support disposed below said first-gas-pervious support in said vessel, said second gas-pervious support being for a fluidised bed of discrete solid particles, means for feeding said particulate material to said vessel and delivering it in non-fluidised condition onto said first support, gaseous medium supply means connected to said vessel below said second gas-pervious support for supplying gaseous medium to said vessel under conditions operative to maintain said fluidised bed of discrete solid particles at an effective density intermediate said high-density and low-density components, and to form said particulate material on said first support into a fluidised bed, a downwardly extending overflow pipe for delivering said particulate material overflowing from the fluidised bed on said first support to said fluidised bed of discrete solid particles on said second support, said overflow pipe communicating with the interior of the fluidising vessel above said first support, extending to the exterior of said vessel and entering said vessel at its lower end, means inserted in said pipe at a point externally of said vessel and operative to pass material down said pipe while eliminating flow along said pipe of gaseous medium emanating from said fluidised bed on said second support, and a feed pipe led to said overflow pipe below said device for the purpose of conveying said discrete solid particles onto said second support.

4. Apparatus according to claim 3, wherein means are provided on said overflow pipe for adjusting the depth of immersion of said overflow pipe into said fluidised bed on said second support.

5. Apparatus according to claim 3, including a discharge pipe communicating with said vessel, and sensing means on said discharge pipe for controlling the rate of extraction of said high-density component, together with associated discrete solid particles from the bottom of said fluidised bed on said second support.

6. Apparatus for cleaning impure coal or other particulate material having components relatively of high-density and low-density in a fluidised bed of discrete solid particles supported on a gas-pervious support, the high-density component sinking onto said support and the low-density component floating on said bed, said gas-pervious support is of generally inverted conical form composed of adjoining inner and outer annular sections inclined to the horizontal, said inner annular section being inclined at a greater angle to the horizontal than said outer section, a rotary rake being provided for sweeping said high-density component from said outer annular section to said inner annular section and a discharge port for said high-density component being provided at the lowermost level of said support.

7. Apparatus for cleaning impure coal or other particulate material having components relatively of high-density and low-density in a fluidised bed of discrete solid particles supported on a gas-pervious support, the high-density component sinking onto said support and the low-density component floating on said bed, said gas-pervious support comprises three concentric annular surfaces adjoining each other and inclined to the horizontal to enable particles from the high-density component to move over said surfaces under the influence of gravity, the inner of said annular surfaces defining an inverted cone and the two outer of said surfaces together defining an annular trough, an outlet port for the high-density component being provided at the lowermost level of said inverted cone, and additional outlet ports for the high-density component being provided at intervals in the bottom of said trough.

8. Apparatus according to claim 7, wherein rotary paddles operating along the bottom of said trough are provided to sweep the high-density component along the bottom of said trough to said outlet ports in the bottom of said trough.

9. Fluidised bed apparatus for cleaning impure small coal or other particulate material having components relatively of high-density and low-density comprising a fluidising vessel, a first gas-pervious support disposed in said vessel, means for feeding said particulate material to said first support, a plurality of further gas-pervious supports disposed in said vessel below said first support, said further supports being for a fluidised bed of discrete solid particles and each having a support surface sloping down to a respective central outlet, and having an open top, means for supplying gaseous medium to said vessel under conditions operative to maintain said fluidised beds of discrete solid particles at an effective density intermediate said high-density and low-density components and to form said particulate material on said first support into a fluidised bed, downwardly extending pipes each for delivering particulate material overflowing the fluidised bed on said first support to a respective one of the beds of discrete solid particles on said further supports, launder means surrounding said further supports for collecting said low-density component overflowing said beds on said further supports and down pipes extending from said outlets from said further supports for discharging the high-density component of said particulate material from said further supports.

References Cited
UNITED STATES PATENTS

| | | | |
|---|---|---|---|
| 754,756 | 3/1904 | Edison | 209—8 |
| 1,801,195 | 4/1931 | Fraser | 209—474 |
| 2,586,818 | 2/1952 | Harms | 209—474 |
| 2,783,889 | 3/1957 | Schaub | 209—474 |
| 2,903,800 | 9/1959 | Skoglund | 34—57 XR |
| 2,960,226 | 11/1960 | Ekstrom | 209—158 |
| 3,034,222 | 5/1962 | Municio | 239—590.3 XR |
| 3,040,439 | 6/1962 | Frost | 34—57 |
| 3,075,643 | 1/1963 | Delachanal | 209—158 |
| 3,079,222 | 2/1963 | Reeve | 34—57 |
| 3,102,603 | 9/1963 | Kerr | 177—123 |
| 3,186,102 | 6/1965 | Brociner et al. | 34—57 XR |

OTHER REFERENCES

Chemical Engineering, vol. 57, issue 6, p. 110, June 1950.

HARRY B. THORNTON, *Primary Examiner.*

L. H. EATHERTON, *Examiner.*